Feb. 3, 1925.
J. G. BLUNT
1,524,775
TRUCK CENTERING DEVICE
Filed June 9, 1924
2 Sheets-Sheet 1
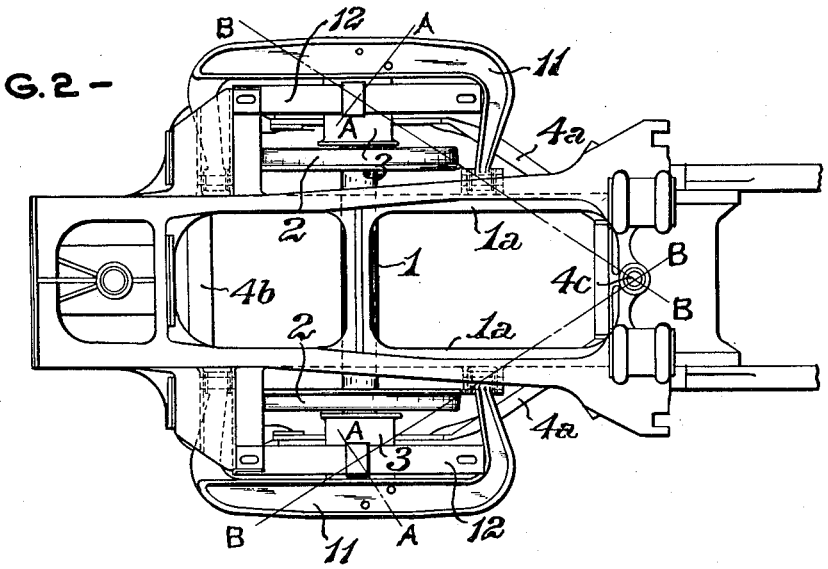
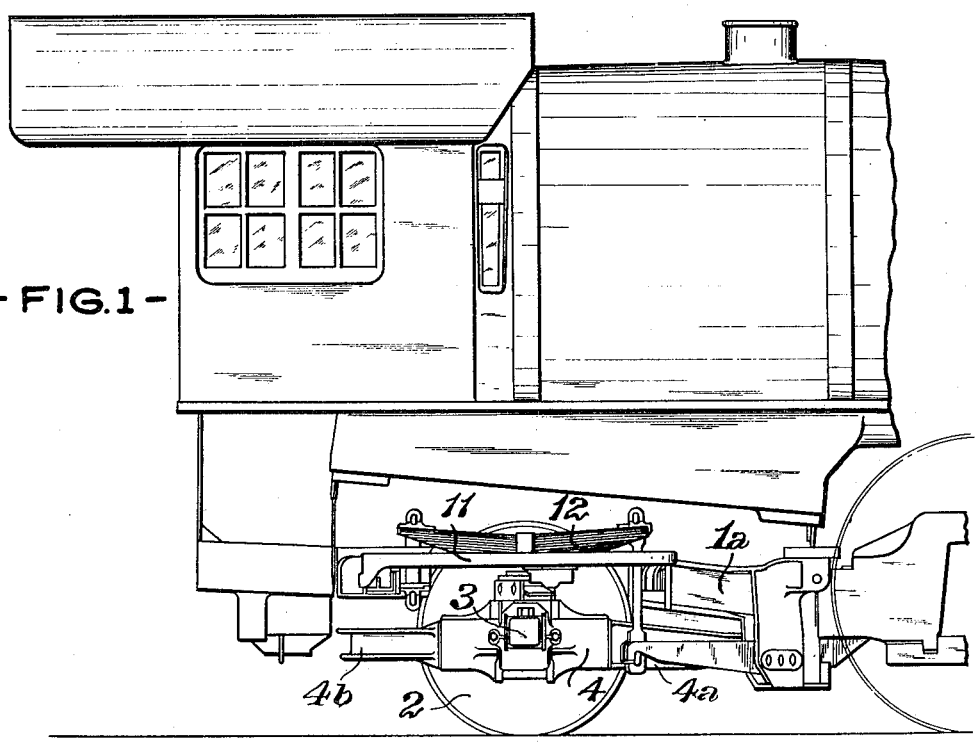
WITNESSES
A. S. Vanderbilt
S. R. Bell
INVENTOR
James G. Blunt
by Thornden Bell
Atty.

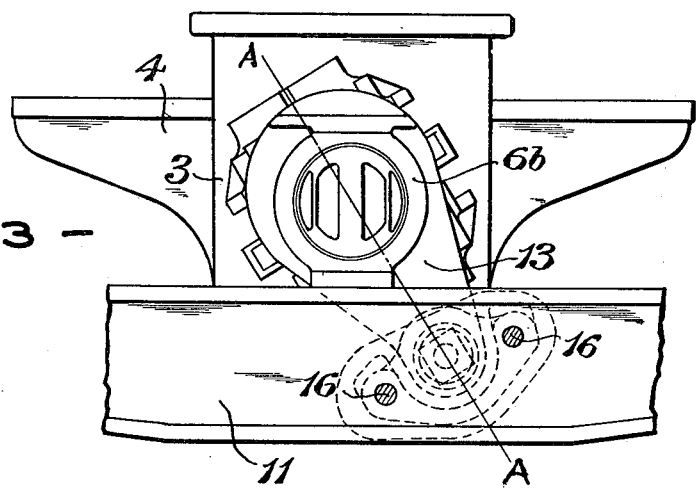
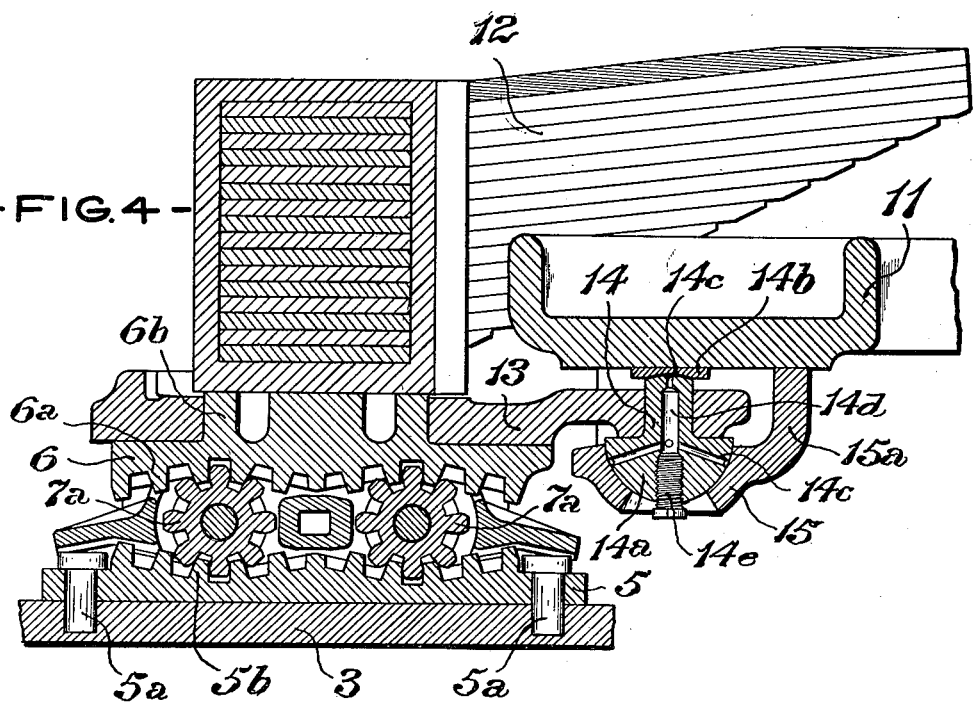

Patented Feb. 3, 1925.

1,524,775

UNITED STATES PATENT OFFICE.

JAMES G. BLUNT, OF SCHENECTADY, NEW YORK.

TRUCK-CENTERING DEVICE.

Application filed June 9, 1924. Serial No. 718,863.

*To all whom it may concern:*

Be it known that I, JAMES G. BLUNT, a citizen of the United States, residing at Schenectady, in the county of Schenectady and State of New York, have invented a certain new and useful Improvement in Truck-Centering Devices, of which improvement the following is a specification.

My invention relates, generally, to centering devices for locomotive trucks of the well known "Cole" type, set forth in Letters Patent of the United States No. 773,713, dated November 1, 1904; No. 936,413, dated October 12, 1909; and No. 991,139, dated May 2, 1911, and, particularly, is an improvement upon that for which Letters Patent of the United States No. 1,482,109 were granted and issued to me, under date of January 29, 1924. The object of my present invention is to provide means of effecting connection between the spring yokes and spring seats of trucks of the type above referred to, in order to render practicable, relatively universal movement of the connected members, and to ensure the transmission of the imposed strains in direct line with the thrust.

The improvement claimed is hereinafter fully set forth.

One of the characteristic features of trucks of the Cole type, consists in yokes, hinged to the frame structure of the locomotive, in such manner as to accommodate the rise and fall of the truck axle relatively thereto, said yokes being so connected to spring seats resting on the tops of the journal boxes, as to maintain the springs parallel with the longitudinal central plane of the locomotive, while the truck is free to assume the lateral displacement necessary to conform to the curvature of the track. Yokes of such character are applied in my invention, preferably together with geared roller resistance devices of the class set forth in my Letters Patent No. 1,482,109 aforesaid, and said members are combined with novel means for effecting their connection and operative combination, as herein described and shown.

In the accompanying drawings: Figure 1 is a side view, in elevation, of the rear end portion of a locomotive engine, illustrating a trailing truck in which my invention is applied; Fig. 2, a plan view of the rear end portion of the locomotive frame and the subjacent trailing truck; Fig. 3, a plan view, on an enlarged scale, of a spring seat, a portion of the adjoining yoke, and the connecting link; and, Fig. 4, a vertical section on a further enlarged scale, on the line A—A of Figs. 2 and 3.

My invention is herein, as in Letters Patent No. 1,482,109 aforesaid, exemplified as applied in a two wheeled locomotive engine trailing truck, of the "Cole" type, in which an axle, 1, on which a pair of wheels, 2, is secured, is fitted to rotate in journal boxes, 3, which are mounted, with the capacity of relative movement, in the side members, 4, of the truck frame, said members being formed integral with forwardly and inwardly extending radius bar arms, $4^a$, and a rear transverse bar, $4^b$. The truck frame is, in the usual manner, pivotally connected to the main frame, $1^a$, of the locomotive by a radius bar pin, $4^c$, located in the longitudinal central plane of the truck, at the forward extremity of the radius bar arms.

In the practice of my invention, referring descriptively to the specific embodiment thereof which is herein exemplified, a lower roller seat, 5, is located on the top of each of the journal boxes, 3, and is secured thereto, in this instance, by dowels, $5^a$, and by welding around its edges. The upper face of the roller seat, 5, is, as in Patent No. 1,482,109 aforesaid, provided with racks, $5^b$, comprising alternately oppositely inclined sets of teeth, which are engaged by pinions, $7^a$, which are fixed on rollers, and also engage teeth on corresponding alternately oppositely inclined racks, $6^2$, on upper roller seats, 6. The upper roller seats, 6, are provided, at their centres, with spring seats, $6^b$, in the form of vertical cylindrical projections, or trunnions, on the flat tops of which the springs, 12, are seated, and the peripheries of which constitute bearings for links, 13, by which the springs are coupled, pivotally, to floating yokes, 11. Said yokes are coupled to the rearwardly extending members of the main frame, $1^a$, of the locomotive, by pins, passing through lugs on their ends. The ends of the links, 13, farther from those that are ccoupled to the spring seats, $6^b$, are coupled to the floating links, 11, by ball and socket joints, as hereinafter described.

The load on the springs, 12, being transmitted directly to the journals of the truck axle, it is necessary that the springs shall remain, continuously, substantially parallel with the longitudinal central plane of the locomotive, when passing through curves of the track, and, therefore, a suitable connection of the springs with the floating yokes, 11, is requisite. As the lateral pressure or thrust, exerted by the truck in curving, is in a line, (A A), at a right angle to a line (B B), passing through the centre of the spring seat and the axis of the radius bar pin, 4ᶜ, the most effective direction of the linkage will be on the lines A A, as indicated in Figs. 2 and 3. This location of the links, 13, is a characteristic feature of my invention.

Universal movement of the links, 13, relatively to the floating yokes, 11, to acommodate movements of the truck, due to undulations in the track, is provided for by connecting said links to the yokes by ball and socket joints, a suitably adaptable form of which is shown in Fig. 4. The outer end of each of the links, 13, is bored out to form an eye, in which a pin, 14, having a balled or spherically curved head, 14ᵃ, is fitted. The head, 14ᵃ, is shouldered against the lower side of the link, 13, and the upper end of the pin, 14, bears against a wear plate, 14ᵇ, interposed between it and the lower side of the adjacent floating yoke, 11. The balled form head, 14ᵃ, is seated in a correspondingly formed socket bearing, 15, on the lower end of a bracket, 15ᵃ, which is secured to the yoke, by bolts, 16. Lubrication is provided for by passages, 14ᶜ, leading from a central oil reservoir, 14ᵈ, in the pin, to the periphery of the head, and to the wear plate, 14ᵇ. Access to the oil reservoir is afforded through an opening closed by a screw plug, 14ᵉ, which is adjustable to induce traverse of oil through the passages.

It will be noted that the lower roller seat, 5, when attached to the truck journal box, becomes a part of the truck, while the upper roller seat, 6, is a part of the locomotive structure proper, the freedom of relative movement of the two seats being provided for by the interposed toothed rollers, meshing with the racks thereof. In order that the seats may be correctly aligned, so as to ensure accurate engagement of the teeth of the rollers with the racks, it is advisable to delay the drilling of the holes for the connecting bolts, 16, until after the truck has been located in operative position under the locomotive, and the proper location of the bolt holes has been accurately determined.

I claim as my invention and desire to secure by Letters Patent:

1. In a locomotive engine, the combination of a main frame; a truck frame, pivotally connected thereto; journal boxes, fitted in the truck frame; springs, transmitting weight from the main frame to the truck frame; spring seats, supporting said springs; means for permitting relative movement of the spring seats and the main frame; and links, coupling the spring seats pivotally to the main frame, and extending normally, at right angles to lines extending from the axis of the truck pivot pin to the centres of the spring seats.

2. In a centering device for locomotive trucks, the combination, with a truck frame and journal boxes fitted therein, of lower roller seats, having alternately reversed inclines on their upper faces, and secured to the journal boxes; correspondingly formed, relatively movable, upper roller seats; spring seats, in the form of flat topped cylindrical projection extending upwardly on the upper roller seats; rollers, interposed between the upper and lower roller seats; and links, each having an eye at one end, fitting the cylindrical body of a spring seat, and an eye at its opposite end adapted to engage a pin for coupling it to the main frame of a locomotive.

3. In a centering device for locomotive trucks, the combination, with a truck frame and journal boxes fitted therein, of lower roller seats, having alternately reversed inclines on their upper faces; and secured to the journal boxes; correspondingly formed, relatively movable, upper roller seats; spring seats, in the form of flat topped cylindrical projection extending upwardly on the upper roller seats; rollers, interposed between the upper end and lower roller seats; links, each having an eye at one end, fitting the cylindrical body of a spring seat; coupling bolts, fitting in eyes at the opposite ends of the links, and having heads balled into segments of spheres; brackets, having end sockets in which said bolt heads are fitted; and bolts, for connecting said brackets to the main frame of a locomotive.

4. In a centering device for locomotive trucks, the combination, with a truck frame and journal boxes fitted therein, of lower roller seats, having alternately reversed inclines on their upper faces; and secured to the journal boxes; correspondingly formed, relatively movable, upper roller seats; spring seats, in the form of flat topped cylindrical projection extending upwardly on the upper roller seats; rollers, interposed between the upper and lower roller seats; links, each having an eye at one end, fitting the cylindrical body of a spring seat; coupling bolts, fitting in eyes at the opposite ends of the links and having heads balled into segments of spheres, each having an internal oil reservoir, and passages leading therefrom to its periphery; screw plugs, closing openings to the oil reservoirs; brackets, having end sockets in which said bolt heads are fitted; and bolts for securing said brackets to the main frame of a locomotive.

5. In a centering device for locomotive trucks, the combination of a link for coupling a roller seat to the main frame of a locomotive, said link having an eye at one end adapted to fit around the cylindrical body of a spring seat fixed on an upper roller seat and a coupling pin eye at its opposite end; a coupling pin, fitted in said last specified eye, and having a segmentally spherical head; a socket in which said head is fitted; and a bracket fixed to said socket and adapted for connection to a locomotive frame.

JAMES G. BLUNT.

Witnesses:
CHAS. M. BELL,
J. HOWARD WAGAR.